Feb. 6, 1923.
A. P. LEE.
REAR DUMPING VEHICLE.
FILED DEC. 19, 1919.

Witnesses:
W. F. Kilroy
Harry R. White

Inventor:
Albert P. Lee
By Babel & Mueller, Attys

Patented Feb. 6, 1923.

1,444,382

UNITED STATES PATENT OFFICE.

ALBERT P. LEE, OF CHICAGO, ILLINOIS, ASSIGNOR TO LEE TRAILER & BODY CO., OF CHICAGO, ILLINOIS.

REAR-DUMPING VEHICLE.

Application filed December 19, 1919. Serial No. 346,039.

*To all whom it may concern:*

Be it known that I, ALBERT P. LEE, a citizen of the United States, residing at Chicago, in the county of Cook and State of Illinois, have invented a certain new and useful Improvement in Rear-Dumping Vehicles, of which the following is a full, clear, concise, and exact description, reference being had to the accompanying drawings, forming a part of this specification.

My invention relates to dumping vehicles and more particularly to rear dump vehicles having one or more hoppers which are adapted to roll automatically from charge receiving to discharge position in which latter position they dump their contents beyond the rear end of the vehicle upon which they are mounted.

It is an object of the invention to provide dumping hoppers and runways upon which said hoppers may roll to dumping position which hoppers and runways may be installed upon an ordinary vehicle chassis.

It is a further object of the invention to provide a plurality of automatically rolling hoppers which may be arranged side by side so that each can dump to the rear of the vehicle upon which the hoppers are mounted. By so dividing the hopper and by selecting hoppers of different sizes the device disclosed may readily accommodate itself to any class of work at hand.

It is a further object of the invention to provide automatically rolling hoppers with means for holding them in normal or charge receiving position and further means to limit the dumping movement of the hoppers and to initiate a return movement of the hoppers toward normal position.

It is a further object of the invention to provide hoppers and cooperating runways which may be installed upon self-propelling vehicles or may be installed upon trailers of ordinary construction. It is a further object to provide, in connection with such trailers, a steering mechanism which may be locked in different positions whereby the trailer may be backed in any desired direction.

It is a further object of the invention to provide a draw bar head which is operatively connected to the steerable wheels of the vehicle, which draw bar head may be locked in a plurality of positions wherein the wheels are out of alinement with the framework of the vehicle and wherein the draw bar head will be automatically locked in position to aline the wheels with the fromework when the draw bar head assumes normal or central position.

With these and other objects in view which will be apparent from the detailed description of the device disclosed in the drawings, I have disclosed certain forms which my invention may take, which forms are the best known to me at the present time. However, it is to be understood that by this specification and the accompanying drawings I do not intend to limit myself to the specific construction disclosed as modifications in the specific structure may be required in the manufacture thereof or may occur to those skilled in this art. The real nature and scope of the invention disclosed is to be determined from the claims appended to this specification.

The same reference characters have been used to designate corresponding parts throughout the several views of the drawings in which—

Figure 1:
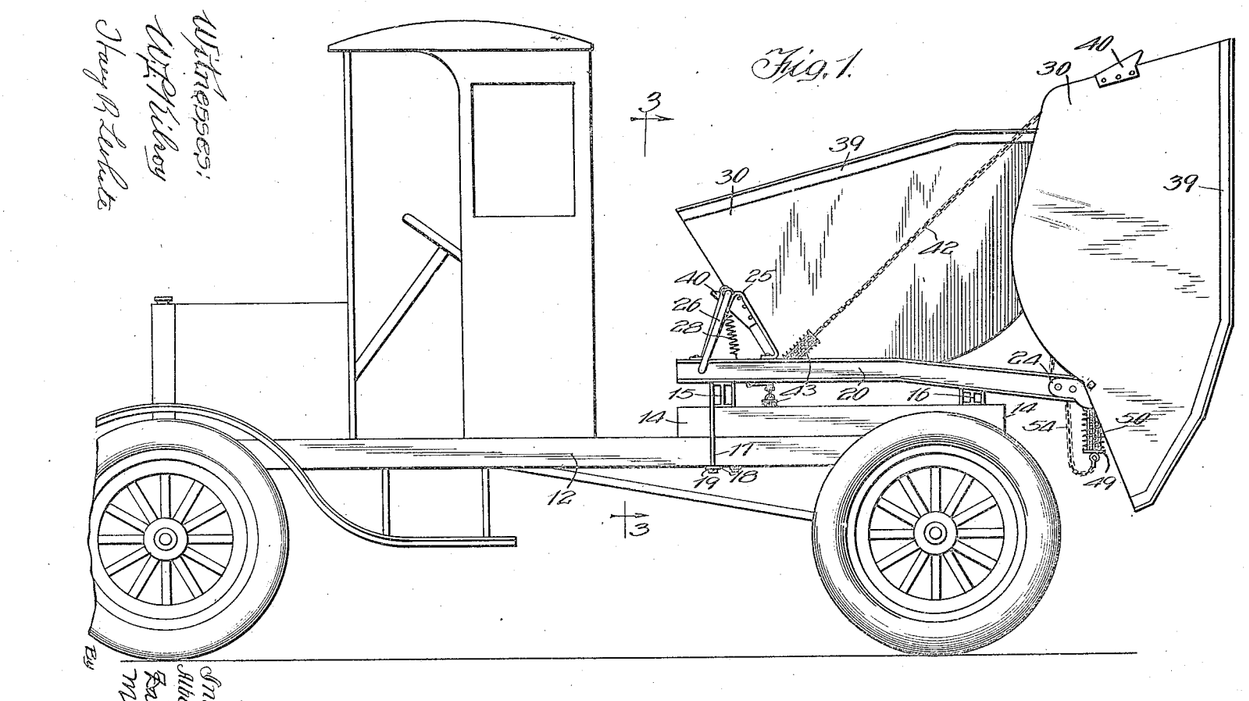
Fig. 1 is a side elevation of a motor vehicle having my improved rear dump hoppers installed thereon. This figure shows one of the hoppers in dumping position.
Figure 3:
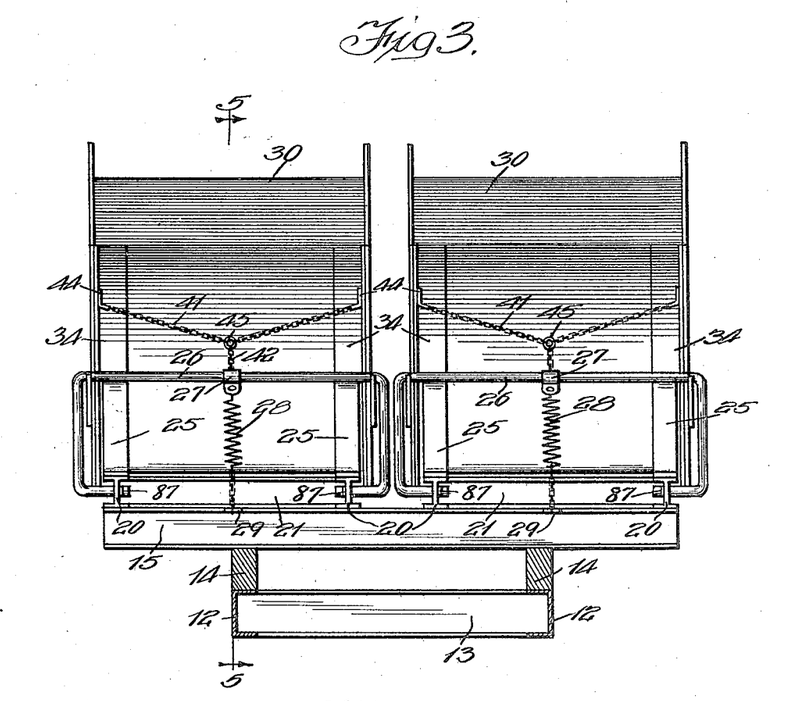
Fig. 3 is a vertical section taken approximately on line 3—3 of Fig. 1 and looking toward the rear of the vehicle.

In the drawings I have disclosed in Fig. 1 a self-propelling vehicle which may be an automobile truck of ordinary construction. Inasmuch as any of the ordinary trucks now manufactured can be used I will not describe the truck in detail. It is only necessary that the truck be provided with a framework 12 which framework is usually rectangular in outline and has a flat top at the rear of the propelling mechanism and driver's seat which flat top accommodates the body or other structure to be mounted on the chassis. In the drawings the chassis 12 comprises channel shaped members as will be clear from Fig. 3 of the drawings. These channel shaped members may be held in rigid spaced relation by means of any suitable cross bars 13. The details of this construction form no part of the present invention. Mounted upon the chassis 12 and positioned on top of the side channel members are longitudinal extending blocks 14 which may conveniently be wooden beams of the desired dimensions. Extending across the blocks 14 are I-beams 15 and 16, the I-beam 16 being lower than the I-beam 15 as shown in Fig. 1 in order to accommodate the downwardly sloping rails which will later be described. The I-beams are securely held in position by means of U-bolts 17 which U-bolts straddle the I-beams in such a manner that the legs of the U-bolt extend on opposite sides of the blocks 14 and channel members 12. Bearing plates 18 and nuts 19 are used to close the U-bolts as will be apparent from the drawings.

Positioned on top of the I-beams 15 and 16 are longitudinal extending rails 20 which rails extend substantially horizontally for about half of their length and then are inclined downwardly as will be clear from Fig. 1 of the drawings. This inclination is necessary to provide an inclined runway down which the hopper may roll to its dumping position. The rails may be secured to the I-beams in any desired manner. The rails are held in rigid spaced relation by means of the I-beam 21 and intermediate channel member 22 and a rear channel member 23. Cooperating with the channel 22 is an angle 22' secured to the bottom of the hopper. The cooperating members 22 and 22' and the brackets 25 provide stops between which the hopper rests when in load carrying position, thus preventing creeping of the hopper longitudinally on the rails as the vehicle is traveling over the ground without interfering with the dumping action thereof. The hopper is, of course held from sidewise shifting due to the interengaging rails 20 and 35. The I-beam and channel members are rigidly secured to the rails 20 by means of rivets as will be clear from an inspection of Fig. 5. Fig. 6 shows two runways comprising four parallel rails, positioned side by side in order to accommodate two hoppers arranged side by side. With this arrangement there will, of course, be two rails for each hopper.

Figure 5:
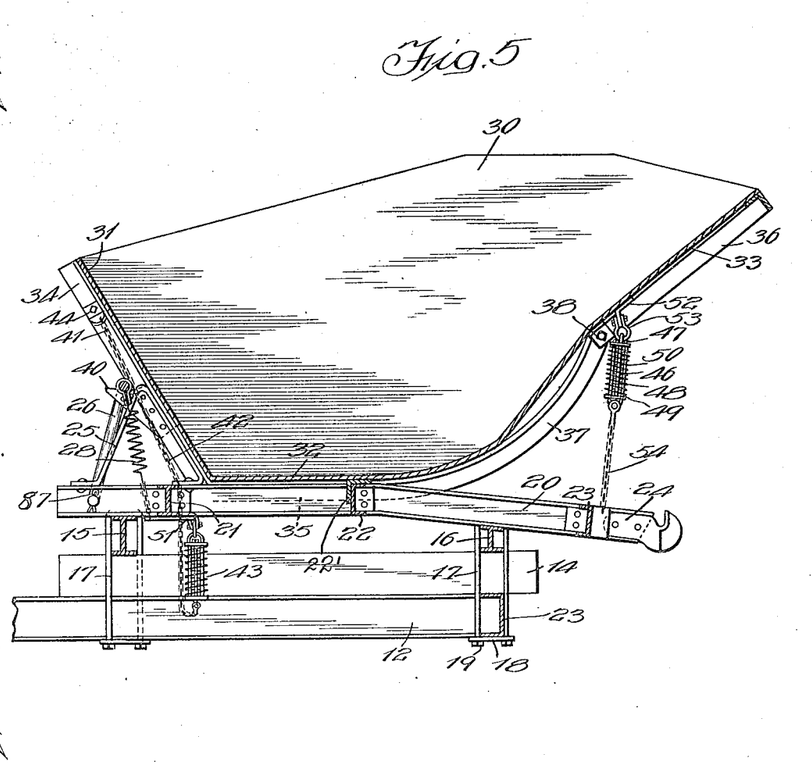
Fig. 5 is a longitudinal vertical section taken approximately on line 5—5 of Fig. 3.
Figure 6:
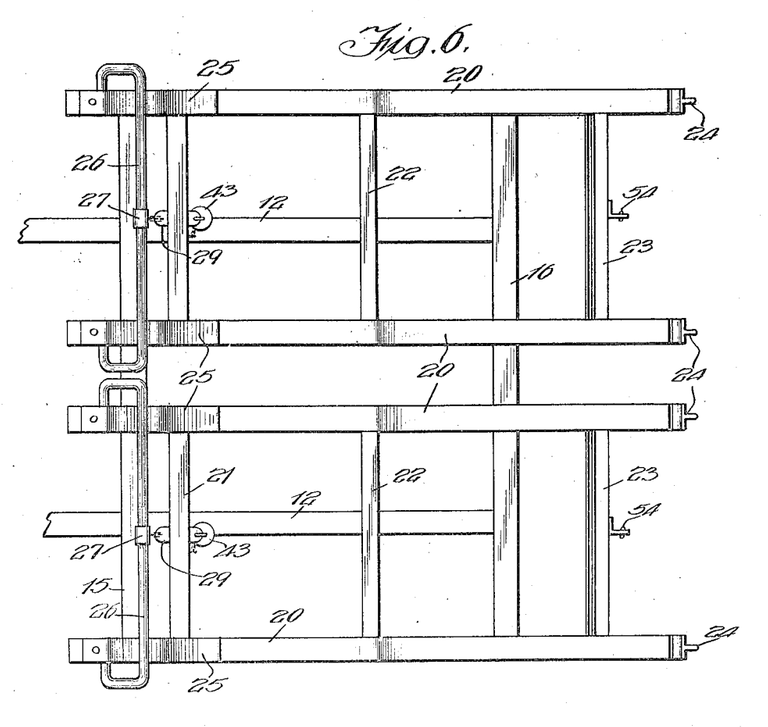
Fig. 6 is a plan view of the double runways for supporting the two hoppers side by side.

At the rear end of each rail 20, which rails are usually formed of I-beams of desired sizes and weight, is provided a hook member 24 suitably secured to the rail by means of rivets as shown in Fig. 5. This hook member provides pivotal means around which the hopper may swing after it reaches the end of the rail.

Figure 4:
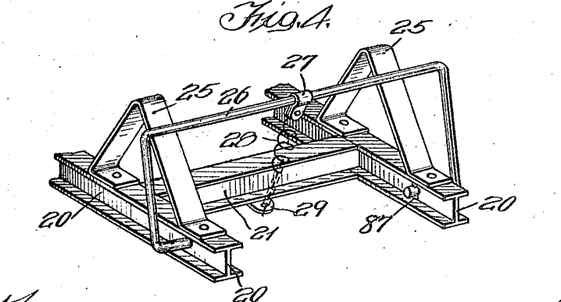
Fig. 4 is a perspective view showing the means for locking one of the hoppers in normal or charge receiving position.

Suitably secured to each rail at the forward end thereof is a bracket 25 which brackets are shaped as shown in Fig. 4 and may be conveniently riveted to the top flanges of the channels 20. These brackets constitute supporting means or inclined abutments against which the hopper may rest while in its normal position. Adjacent the brackets 25 each pair of rails 20 supports a bail member 26 which is formed of an ordinary gas pipe bent to the shape shown in Fig. 4 and has its ends passing through suitable openings in the vertical webs of the rails 20. The free ends of the bail 26 are provided with suitable openings to receive cotter pins 87 whereby the bail is removably held in operative position adjacent the brackets 25. Located on the bail 26 is a clasp 27 to which is secured one end of a coil spring 28 which extends downwardly and has its other end secured to an eyelet 29 positioned on the lower edge of the I-beam 21. With this arrangement it will be apparent that the spring 28 tends to hold the bail 26 against the brackets 25 at all times.

My improved hopper is disclosed in cross section in Fig. 5 and is constructed substantially as shown in my copending application Serial No. 335,437 filed November 3, 1919. The hopper comprises side walls 30 an inclined front wall 31 a substantially flat bottom wall 32 and an inclined rear wall 33. Extending around the hopper just described and conforming to the general outlines of the hopper are bearing rails which comprise an inclined front portion 34, a flat bottom portion 35 and a rear inclined portion 36. The portions 35 and 36 are connected by curved sections 37 which cooperate with the inclined portions of the rails when the hopper rolls to dumping position. Rigidly secured to the bearing rails at approximately the point where the rail sections 36 and 37 meet, are pins 38 which, when the hopper reaches the end of the rails engage in the hook members 24 and provide pivotal means around which the hopper may swing until it reaches its full discharge position.

The hoppers are preferably reinforced along their upper edges by means of angle members 39. Rigidly secured to the hoppers and preferably riveted to the bearing rail sections 34 are hooked members 40 which are adapted to be engaged by the bail members 26 when the hoppers are in normal position, whereby the bails serve to hold the hoppers in their normal position. The hook members 40 are shaped as shown in Figs. 1 and 5 of the drawings so that when the hoppers return to normal position the hook members automatically pass beneath the bail members 26 and permit the bail members to be drawn over the extending points of the hooks by means of the springs 28. With this construction no extra operation is necessary to lock the hoppers when they are returned to normal position.

In order to limit the swinging movement of the hoppers toward dumping position I employ chains 41 and 42 and yieldable connecting members 43. Each chain 41 is conveniently secured to its hopper by means of plate members 44 which may be conveniently secured to the bearing rail sections 34 as shown in Fig. 5. These plates have openings to receive the end links of the chain. At its mid-point each chain 41 is provided with an eyelet 45 to which the chain 42 is connected. The other end of the chain 42 extends downwardly and is connected to one member of the spring element 43 which may be constructed as shown in detail in Figure 2. This construction involves a U-shaped member 46 whose ends pass through the washer 47 and are provided with nuts to hold the washer on the member. This U-shaped member passes through the end link of the chain. A second U-shaped member 48 is positioned so that its closed end extends in a direction opposite from the closed end of the member 46. This member is likewise provided with a washer 49 which is held on the member 48 by means of nuts. A coil spring 50 surrounds the members 46 and 48 and is confined between the washers 47 and 49. The closed end of the member 48 passes through a link connected to eyelet 51 which may be conveniently formed at the other end of the plate which forms the eyelet 29 to which the spring 28 is attached. With the construction just described it will be apparent when the hopper reaches the limit of its dumping movement the spring 50 is placed under tension. This serves to cushion the hopper and also initiates a return movement of the hopper toward normal position, it being understood that the hopper is so designed that it will be substantially balanced in its normal load carrying position when empty so that the same will tend to return automatically to normal or load carrying position after the same is emptied it requiring little or no effort to return the hopper to load carrying position.

Figure 2:
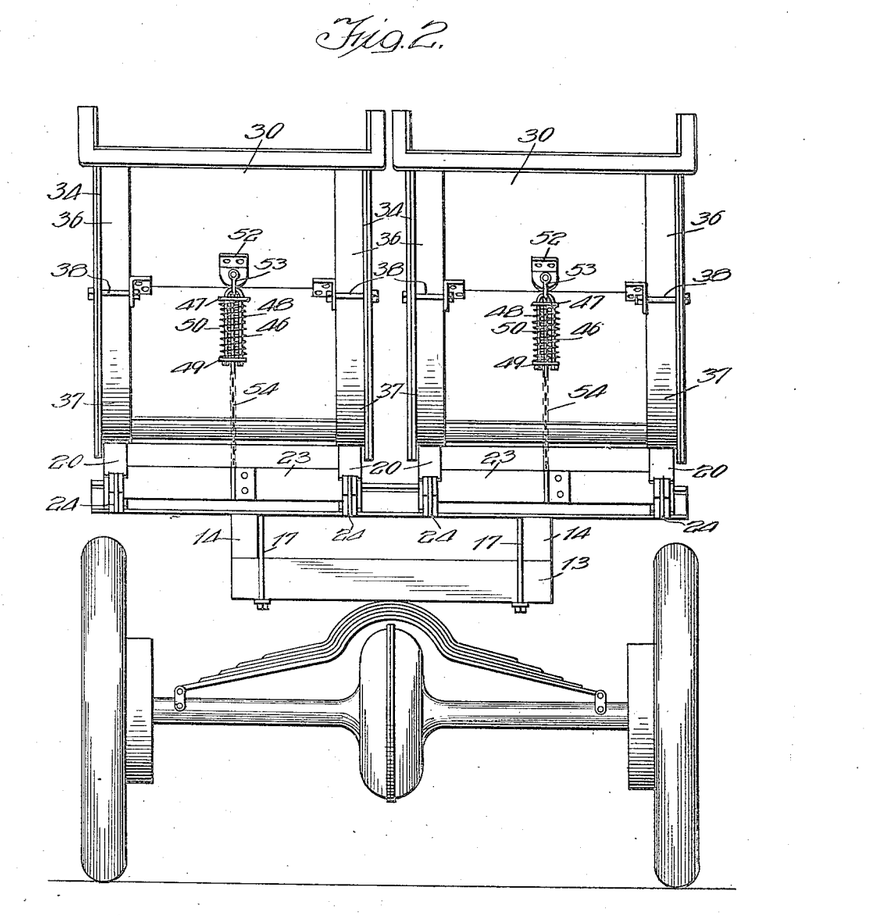
Fig. 2 is a rear elevation of the vehicle shown in Fig. 1 but with both hoppers in normal or charge receiving position.

Suitably secured to the rear wall of each hopper is a plate member 52 which constitutes an eyelet adapted to receive a clevis 53 which passes through the closed end of the U-shaped member 48 as shown in Fig. 2 of the drawings. The other U-shaped member 46 is connected to a chain 54 which passes downwardly and has its lower end rigidly attached to the channel member 23 as shown in Fig. 6 of the drawings. The length of the chain 54 and its cooperating yieldable element is such that when the hopper is in normal position the spring 50 is under tension. Therefore, when the bail member 26 is released from the hooks 40 the spring 50 will tend to start the hopper toward its dumping position. This movement is assisted by the load contained within the hopper and also by means of the hopper itself which is so constructed that the center of gravity of the load and the hopper acts through a line to the rear of the top end of the inclined sections of the rails.

The rails 20 are raised above the tops of the wheels and the side rails may extend over the wheels any desired amount. If small hoppers are used it will be apparent that the combined width is less than when wider hoppers are used. Wider hoppers can conveniently be used because the rails will merely extend slightly further beyond the wheels than shown in the drawings.

From what has been described above it will be apparent that I have provided a simple and compact dumping hopper mechanism which may be installed on any ordinary flat topped automobile or other chassis. If the top of the chassis used is inclined instead of horizontal the blocks 14 may be shaped to accommodate the chassis in question. This change will usually not be necessary because the framework of the ordinary automobiles or other chassis will have a flat rectangular top.

Figure 7:
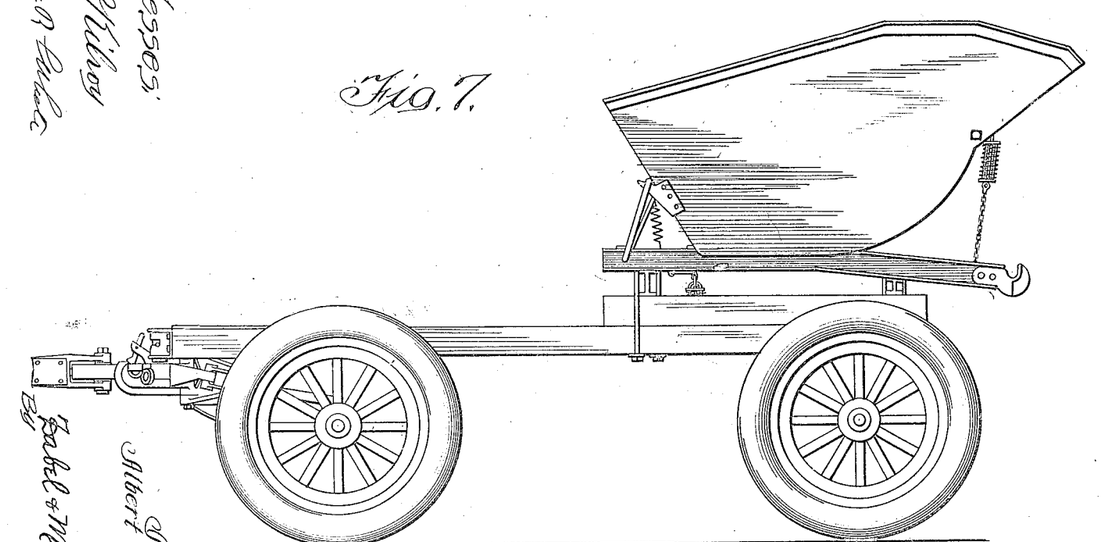
Fig. 7 is a side elevation of my improved dumping hoppers mounted upon a trailer of ordinary construction.

In Fig. 7 I have shown my improved hopper mechanism installed upon a trailer having an ordinary flat topped rectangular chassis. As the parts disclosed here are constructed like those just described further description will not be given.

In connection with the trailer disclosed I use a novel steering mechanism which is disclosed more in detail in Figs. 8 to 11. This steering mechanism comprises a draw bar 60 which draw bar is constructed substantially the same as that shown in my copending application Serial No. 289,490 filed April 12, 1919. This draw bar is pivotally mounted on a vertical pivot 61 carried by the shorter supporting section 62. The section 62 has a notch in its forward end which is adapted to be engaged by the bolt 63 when it is desired to lock the parts 60 and 62 in rigid relation. When so locked they constitute a single rigid member as disclosed in my application referred to.

Figure 8:
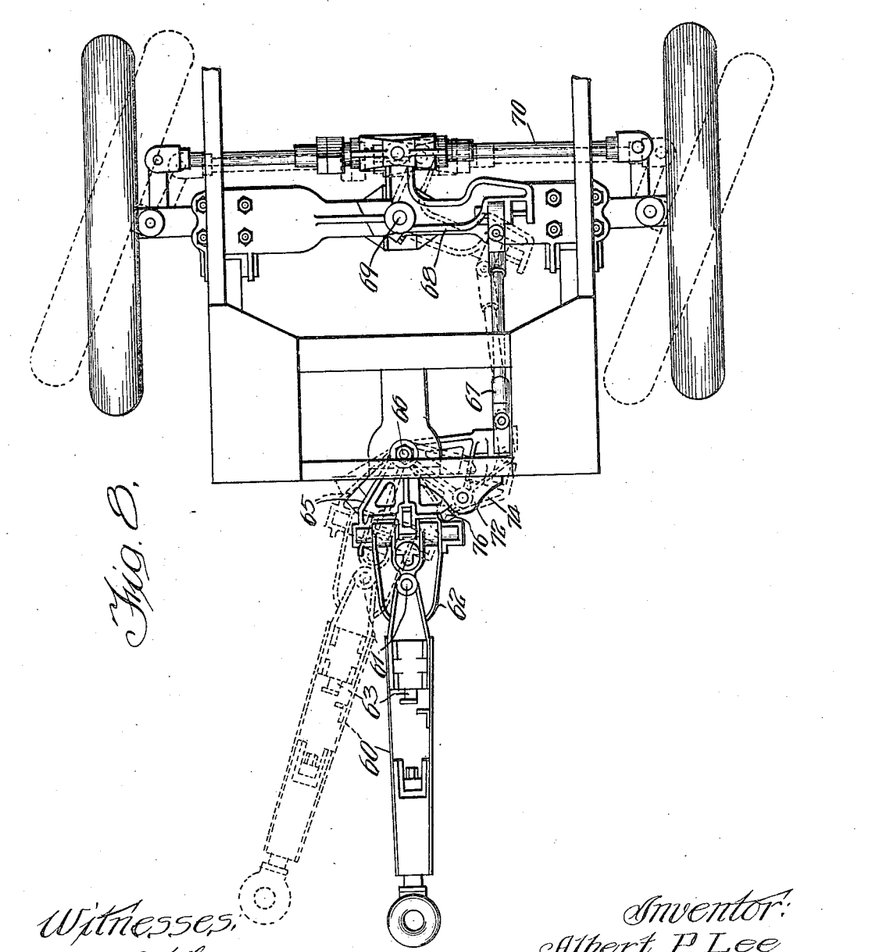
Fig. 8 is a plan view of the steering mechanism employed at the forward end of the trailer shown in Fig. 7.
Figure 9:
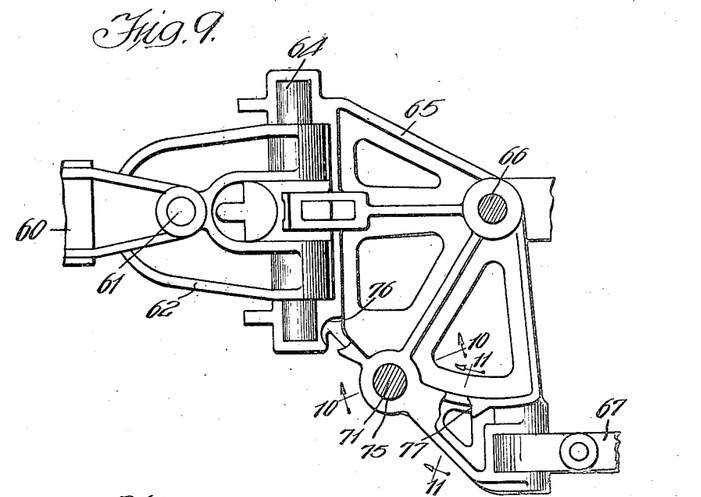
Fig. 9 is a plan view showing the detailed construction of the steering head to which the draw bar is pivotally connected.
Figure 10:
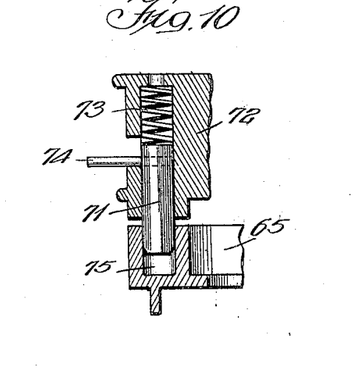
Fig. 10 is a vertical section taken on line 10—10 of Fig. 9.
Figure 11:
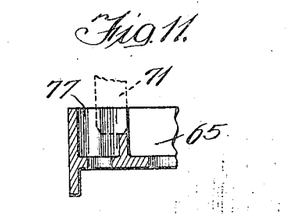
Fig. 11 is a corresponding section taken on line 11—11 of Fig. 9.

The short supporting section 62 is pivotally connected by means of a horizontal pivot 64 to the steering head 65 which steering head is constructed substantially as shown in my copending application Serial No. 289,489. When the members 60 and 62 are locked in rigid relation and are swung in a horizontal plane the steering head 65 is swung in a horizontal plane about the pivot 66 which is rigidly carried by the framework of the trailer. The head 65 is pivotally connected by means of the link 67 to bell crank lever 68 which is pivotally mounted on the pivot 69 carried by the axle. The other arm of the bell crank lever is connected to the tie rod 70 which is connected in the usual manner to the steering knuckles of the wheels. The connection between the bell crank lever 68 and the tie rod 70 is constructed substantially as shown in my copending application Serial No. 306,202, filed June 23, 1919 and will not be further described here. The steering head 65 is adapted to be locked in normal position wherein the wheels are alined with the framework of the trailer by means of the locking bolt 71 which slides vertically in a rigid portion 72 of the framework and is pressed downwardly by means of the coil spring 73. The bolt 71 is provided with a handle member 74 which may be rotated in a horizontal direction to withdraw the bolt in the manner disclosed in my copending application Serial No. 289,489. When the bolt 71 is withdrawn and the parts 60 and 62 are locked in rigid relation the draw bar serves to steer the wheels of the trailer in the ordinary manner. When the bolt 71 is in locking position and bolt 63 is withdrawn the wheels remain in fixed relation with the framework and the draw bar may swing freely about the pivot 61.

It is sometimes desirable when backing the trailer or even when moving it forwardly that the wheels be locked in position out of alinement with the trailer framework whereby the vehicle will be steered to some desired position. I provide means whereby this may be accomplished. Formed adjacent the opening 75 for the bolt 71 is a second opening 76 and on the opposite side of the opening 75 is a third opening 77. The three openings 75, 76 and 77 are formed on the circumference of a circle of which the pivot 66 is the center. It will, therefore, be apparent that the bolt 71 may engage any of the openings 75, 76, and 77. When the bolt engages the opening 77 the wheels will be positioned as shown in dotted lines in Fig. 8. When the bolt engages the opening 76 the wheels will obviously be turned in the opposite direction. In this manner the trailer may be accurately steered to any desired position. When the steering head 65 is locked with the bolt in either of the notches 76 or 77 the bolt 63 may be withdrawn whereupon the trailer may be backed up or drawn forwardly by the propelling vehicle and when moved will be accurately steered to the desired position.

From what has been described it will be apparent that I have devised and constructed a novel steering mechanism which may be conveniently used in connection with the hopper mechanism disclosed whereby the load may be discharged in any desired position.

Having thus described my invention what I claim as new and desire to secure by United States Letters Patent is:

1. A device of the character described comprising a runway, a one-way dumping hopper adapted to roll when loaded substantially automatically on said runway from charge carrying to discharge position and having a tendency to return to load carrying position when the load has been discharged therefrom, and yieldable means extending between said hopper and said runway at opposite ends thereof, one of said means yieldingly limiting the discharge movement of said hopper and initiating return movement thereof, and the other of said means initiating discharge movement of said hopper.

2. A device of the character described comprising a plurality of pairs of parallelly arranged rails, arranged on opposite sides of the longitudinal center line of said vehicle, each rail having a straight portion and a downwardly inclined portion, means connecting the rails of each pair to hold them in parallel relation, brackets carried by the straight portions of the rails, a hopper adapted to roll on each pair of said rails and when in normal position resting against said brackets, a chain for limiting the dumping movement of each of said hoppers and resilient means interposed between said chain and the rails.

3. A device of the character described comprising a runway, a hopper adapted to roll on said runway from discharge carrying to discharge position, a bail member carried by the runway for holding the hopper in charge carrying position, yieldable means to limit the discharge movement of the hopper, and a second yieldable means at the other end of the hopper for initiating the discharge movement of the hopper.

4. A device of the character described comprising a runway and a hopper positioned on said runway, a bracket carried by the runway against which the hopper may rest when in normal position, a bail member carried by the runway for locking the hopper in normal position, and resilient means to maintain said bail member in normal or locking position whereby said hopper is automatically locked in normal position.

5. A device of the character described comprising a vehicle framework, a runway supported on said framework and extending longitudinally thereof, said runway having a substantially flat portion and a downwardly inclined portion, a hopper having a substantially flat portion conforming to the flat portion of said runway adapted to rest with said flat portions in engagement when in normal position and adapted to roll substantially automatically down said inclined portion to discharge position, and means for preventing creeping of said hopper longitudinally of said runway when in normal position, said means comprising an abutment against which the forward end portion of said hopper rests when in normal position, means for holding said hopper in engagement with said abutment to prevent upward movement of said hopper relative thereto and a transversely extending flange on said hopper engaging a transverse abutment on said runway to prevent creeping of said hopper rearwardly.

In witness whereof, I hereunto subscribe my name this 17th day of December, A. D., 1919.

ALBERT P. LEE.